US010491024B2

(12) United States Patent
Olson et al.

(10) Patent No.: US 10,491,024 B2
(45) Date of Patent: Nov. 26, 2019

(54) CHARGING SYSTEMS FOR CONTACT CHARGERS AND RELATED METHODS

(71) Applicant: Starkey Laboratories, Inc., Eden Prairie, MN (US)

(72) Inventors: Kyle Olson, St. Louis Park, MN (US); Sidney A. Higgins, Maple Grove, MN (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 15/797,239

(22) Filed: Oct. 30, 2017

(65) Prior Publication Data

US 2018/0123355 A1 May 3, 2018

Related U.S. Application Data

(60) Provisional application No. 62/414,136, filed on Oct. 28, 2016.

(51) Int. Cl.
*H02J 7/00* (2006.01)
*H04R 25/00* (2006.01)

(52) U.S. Cl.
CPC ............ *H02J 7/008* (2013.01); *H02J 7/0042* (2013.01); *H02J 7/0047* (2013.01); *H04R 25/30* (2013.01);
(Continued)

(58) Field of Classification Search
CPC ........ H02J 7/008; H02J 7/0047; H02J 7/0042; H04R 25/30; H04R 25/602; H04R 2225/33; H04R 2225/31; H04R 2225/61
See application file for complete search history.

(56) References Cited

U.S. PATENT DOCUMENTS

| 3,964,296 A | 6/1976 | Matzuk |
| 4,097,792 A | 6/1978 | Calaway |

(Continued)

FOREIGN PATENT DOCUMENTS

| CN | 204631181 | * 6/2015 | ............. G01R 31/02 |
| CN | 204631181 | * 9/2015 | ............. G01R 31/02 |
| DE | 102009033898 B3 | 11/2010 | |

OTHER PUBLICATIONS

European Search Report for European Patent Application No. 17195019.9, dated May 24, 2018, 12 pages.

(Continued)

*Primary Examiner* — Oyesola C Ojo
(74) *Attorney, Agent, or Firm* — Mueting, Raasch & Gebhardt, P.A.

(57) ABSTRACT

Systems and methods relate to a charger and a rechargeable device. The rechargeable device includes a power manager and a power storage device. The power manager may include one or more diodes and a controller configured to detect a charging current, provide a managed power output, and modulate the charging current to communicate through the current. The charger may include controller configured to store a device identifier in memory associated with a last charge state, determine whether a retrieved device identifier matches, and provide an indication of a current charge state in response to a match. The controller of the charger may be configured to send an electrical pulse to the rechargeable device and determine a polarity for charging the device.

20 Claims, 9 Drawing Sheets

(52) U.S. Cl.
CPC ....... *H04R 25/602* (2013.01); *H04R 2225/31* (2013.01); *H04R 2225/33* (2013.01); *H04R 2225/61* (2013.01)

(56) References Cited

U.S. PATENT DOCUMENTS

| | | | | |
|---|---|---|---|---|
| 5,280,229 | A * | 1/1994 | Faude | H02J 7/0045 |
| | | | | 320/110 |
| 5,527,637 | A | 6/1996 | Nakazawa et al. | |
| 5,610,494 | A * | 3/1997 | Grosfilley | H02J 7/0044 |
| | | | | 320/107 |
| 5,623,550 | A | 4/1997 | Killion | |
| 5,635,819 | A * | 6/1997 | Ryberg | H02J 7/14 |
| | | | | 320/162 |
| 5,742,149 | A * | 4/1998 | Simpson | H02J 7/0004 |
| | | | | 320/107 |
| 6,275,681 | B1 | 8/2001 | Vega | |
| 6,399,920 | B1 | 6/2002 | Guinn | |
| 6,625,900 | B1 | 9/2003 | Tobias | |
| 6,879,809 | B1 * | 4/2005 | Vega | G06K 7/0008 |
| | | | | 455/41.1 |
| 7,005,832 | B2 * | 2/2006 | Nordlof | H02J 7/022 |
| | | | | 320/121 |
| 7,449,875 | B2 * | 11/2008 | Chang | G01R 19/14 |
| | | | | 320/110 |
| 7,515,725 | B2 | 4/2009 | Fluit | |
| 7,620,195 | B2 * | 11/2009 | Bengtsson | H04R 25/305 |
| | | | | 381/314 |
| 7,710,079 | B2 | 5/2010 | Martin | |
| 7,847,516 | B2 * | 12/2010 | Kung | H02J 7/0047 |
| | | | | 320/106 |
| 8,098,862 | B2 | 1/2012 | Koch et al. | |
| 8,329,323 | B2 | 12/2012 | Atkinson | |
| 9,148,717 | B2 * | 9/2015 | Shaffer | H04R 1/1025 |
| 9,354,538 | B2 | 5/2016 | Seki et al. | |
| 9,362,766 | B2 | 6/2016 | Workman et al. | |
| 9,621,999 | B2 | 4/2017 | Sudan | |
| 2003/0098670 | A1 * | 5/2003 | Kobayashi | H02J 7/0068 |
| | | | | 320/114 |
| 2005/0027465 | A1 * | 2/2005 | Pozsgay | H02J 7/0052 |
| | | | | 702/63 |
| 2005/0253554 | A1 * | 11/2005 | DiFazio | H02J 7/00 |
| | | | | 320/114 |
| 2008/0240480 | A1 * | 10/2008 | Pinnell | H04R 25/602 |
| | | | | 381/323 |
| 2009/0034749 | A1 | 2/2009 | Klemenz et al. | |
| 2009/0067652 | A1 * | 3/2009 | Schmidt | H04R 25/556 |
| | | | | 381/314 |
| 2009/0074219 | A1 * | 3/2009 | Klemenz | H04R 25/00 |
| | | | | 381/324 |
| 2010/0060232 | A1 * | 3/2010 | Boyles | H02J 7/0027 |
| | | | | 320/107 |
| 2010/0317977 | A1 | 12/2010 | Piaget et al. | |
| 2011/0007491 | A1 | 1/2011 | Robinson et al. | |
| 2011/0181242 | A1 * | 7/2011 | Lee | H02J 7/0003 |
| | | | | 320/110 |
| 2011/0234160 | A1 * | 9/2011 | Smith | H02J 7/0009 |
| | | | | 320/110 |
| 2013/0015824 | A1 * | 1/2013 | Newton | H02J 7/0034 |
| | | | | 320/165 |
| 2014/0261425 | A1 | 9/2014 | Connor | |
| 2015/0130406 | A1 * | 5/2015 | Jing | H02J 7/0042 |
| | | | | 320/108 |
| 2015/0200558 | A1 * | 7/2015 | Castillo | H02J 7/0044 |
| | | | | 320/107 |
| 2015/0214755 | A1 * | 7/2015 | Crawley | H02J 7/0013 |
| | | | | 320/112 |
| 2015/0229151 | A1 * | 8/2015 | Sudan | H02J 7/0072 |
| | | | | 320/137 |
| 2015/0326982 | A1 * | 11/2015 | Sudan | H04R 25/305 |
| | | | | 381/323 |
| 2015/0357742 | A1 | 12/2015 | Lee | |
| 2015/0380961 | A1 * | 12/2015 | Tseng | H02J 7/0034 |
| | | | | 320/107 |
| 2017/0094393 | A1 * | 3/2017 | Panecki | A45C 13/02 |
| 2017/0279165 | A1 * | 9/2017 | Tanii | H01M 10/44 |

OTHER PUBLICATIONS

Partial European Search Report for European Patent Application No. 17195019.9, dated Feb. 20, 2018, 14 pages.
Siemens, "eCharger User Guide—Master", Sep. 2014; 20 pages.
"WildCharge Cordless Charging Mat Review", Retrieved Oct. 25, 2016 from https://www.youtube.com/watch?v=gP-jHI3-FEY, Nov. 28, 2009; 1 page.
ZPower Rechargeable System for Hearing Aids, "User Manual", 2015; 16 pages.
U.S. Appl. No. 15/337,141, filed Oct. 28, 2016, Higgins et al.

* cited by examiner

CHARGING SYSTEMS FOR CONTACT CHARGERS AND RELATED METHODS

CROSS-REFERENCE TO RELATED APPLICATIONS

The present application claims the benefit of U.S. Provisional Patent Application Ser. No. 62/414,136, filed Oct. 28, 2016, which incorporated pending U.S. application Ser. No. 15/337,141, filed on the same day therewith Oct. 28, 2016, both of which are incorporated entirely herein by reference.

TECHNICAL FIELD

The present disclosure relates to a charging system. In particular, the present disclosure relates to a charging system capable of charging a rechargeable device in various orientations.

BACKGROUND

Hearing devices may include hearing aids (HAs) or a device with a transducer for providing personalized sound to an individual's ear. For example, hearing aids may be used to assist a person suffering from hearing loss by transmitting amplified sound directly to the person's ear canals. In one example, a hearing aid is worn in and/or around a person's ear and may be contoured with curved surfaces to facilitate comfort in use. Many hearing devices are portably powered with a battery. Some hearing devices with rechargeable batteries may be charged in a specific charging station.

The charging process is often controlled by the charging station. But some charging stations are unable to sufficiently control the amount of current delivered to the hearing device to be charged. In some cases, external contaminants or certain placements of the hearing device may hamper or alter the electrical connection between the charging station contacts and the hearing device contacts beyond the capabilities of the charging station. For example, hearing devices inherently get dirty being placed in the user's ear for many hours per day. Compensating for such effects may require more complex and expensive components to be placed in the charging station.

Hearing devices sometimes utilize a lithium-ion (Li-ion) battery, which may be permanently or removably installed. Regardless of charging algorithms, for a charger to detect whether a Li-ion battery is fully charged can take a few to several minutes (for example, up to ten minutes) due to the chemistry of the Li-ion battery, even when the battery is fully charged at the beginning of the charging process. This can be inconvenient for some users who want to check the status of the hearing device without waiting a few minutes for the algorithm to complete and report a charging status.

Many charging stations or hearing device storage cases include a drying mechanism, such as a desiccant. Typically, the desiccant must be replaced or removed and dehydrated every two or more days, which may be inconvenient for some users to remember to perform this routine maintenance.

Some charging stations are capable of communicating with hearing devices. In some cases, the charging station requires an amplified, constant voltage reference with a buffer amplifier of unity gain, a comparator, and serial communication hardware to facilitate communication. Charging more than one hearing device may require two sets of these components, adding complexity and cost to the charging station.

Charging stations relying on buttons for operation can be difficult for some users to operate, particularly when the buttons are utilized with smaller travel charging stations. Charging stations without buttons often include a low power mode that reduces battery charge consumption while monitoring for when a hearing device has been placed in the charger to start the charging process.

A visual indicator, such as a light-emitting diode (LED), may be included on the exterior of some charging stations. The visual indicator may indicate that the charging process is underway. However, charging of hearing devices is often done at night on a nightstand, for example, and the visual indicator may disturb a user's ability to sleep.

The discussion of prior publications and other prior knowledge does not constitute an admission that such material was published, known, or part of the common general knowledge.

SUMMARY

Various aspects of the present disclosure relate to a charging system and related methods. The charging system may be capable of charging a rechargeable device in various orientations. The rechargeable device may include a power manager and a power storage device. The power manager may include a controller configured to modulate the charging current to communicate through the current. The charger may include controller configured to match a device identifier in memory to a retrieved device identifier and provide an indication of a current charge state. The controller of the charger may be configured to determine a polarity for charging the device.

In one aspect, the present disclosure relates to a system. The system includes a rechargeable hearing device having a power manager and a power storage device. The power manager includes a pair of terminals configured to receive a charging current; one or more diodes electrically coupled to the pair of terminals; a voltage regulator operatively coupled to the one or more diodes; and a controller operatively coupled to the voltage regulator and having a processor. The processor is configured to detect a portion of the charging current; provide a managed power output to the power storage device in response to the portion of the charging current; and modulate the portion of the charging current to communicate over the pair of terminals.

In another aspect, the present disclosure relates to a charger for a rechargeable hearing device. The charger includes a charging cavity configured to receive a hearing device. The charger also includes a pair of contacts exposed to the charging cavity. The contacts are electrically coupled to the hearing device to provide a charging current when the hearing device is received in the charging cavity. The charger further includes a controller having a processor and a memory. The processor is configured to store a hearing device identifier in the memory associated with a last charge state; retrieve a hearing device identifier from the hearing device when received in the charging cavity; determine whether the retrieved hearing device identifier matches the stored hearing device identifier in the memory; and provide an indication of a current charge state of the hearing device in response to the retrieved hearing device identifier matching the stored hearing device identifier in the memory.

In another aspect, the present disclosure relates to a charger for a rechargeable hearing device. The charger includes a charging cavity configured to receive a hearing device. The charger also includes a pair of contacts exposed to the charging cavity. The contacts are electrically coupled to the hearing device to provide a charging current when the hearing device is received in the charging cavity. The charger further includes a controller having a processor. The processor is configured to detect a hearing device in the charging cavity; send an electrical pulse through one of the contacts; and determine a polarity for charging the hearing device in response to whether the pulse was received by the other contact.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
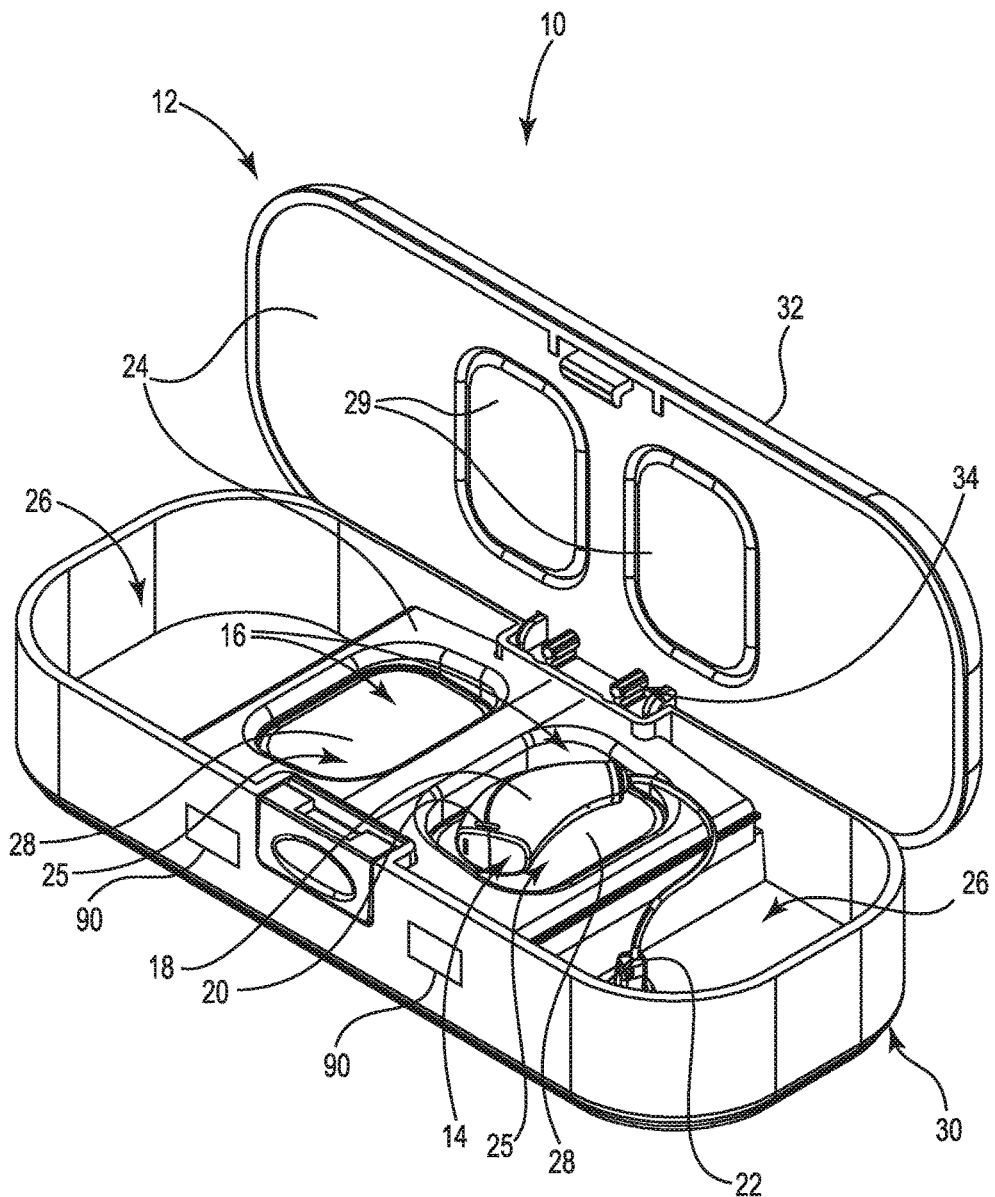
FIG. 1 is an illustration in perspective view of a charging system including a contact pad charger and a rechargeable device.

The present subject matter is demonstrated for rechargeable devices, which may be portable devices or wearable devices, such as hearing devices. Hearing devices may include hearing assistance devices, or hearing aids of various types, such as behind-the-ear (BTE), in-the-ear (ITE), in-the-canal (ITC), receiver-in-canal (RIC), or completely-in-the-canal (CIC) type hearing aids. It is understood that BTE type hearing aids may include devices that reside substantially behind the ear or over the ear. Such devices may include hearing aids with receivers associated with the electronics portion of the device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted, or occlusive fitted. The present subject matter may additionally be used in consumer electronic wearable audio devices having various functionalities. Other applications may be understood by a person of ordinary skill having the benefit of the present disclosure.

For example, the present subject matter is demonstrated for contact chargers and rechargeable devices as disclosed in U.S. application Ser. No. 15/337,141, entitled CHARGING SYSTEM WITH COMPRESSIBLE CONTACTS, filed on Oct. 28, 2016.

Advantageously, the present disclosure may provide a charging system capable of compensating for variables in the charging process of a rechargeable device, particularly of a hearing device. The charging process may be at least partially controlled by the hearing device, which may simplify the design of the charger and facilitate a more universal compatibility of the charger with such hearing devices. The charging system may provide a user with a state-of-charge indication, cleanliness monitors for each hearing device, automated device drying, or combinations thereof. The charging system may also utilize a memory to store the state of charge of an individual hearing device to aid in rapid reporting of the state of charge. The charging technique may further include a sleep mode where visual indicators turn off while the user is sleeping.

In some embodiments, a rechargeable device includes a power manager and a power storage device. The power manager may include one or more diodes and a controller configured to detect a charging current, provide a managed power output, and modulate the charging current to communicate through the current. In some embodiments, the charger may include controller configured to store a device identifier in memory associated with a last charge state, determine whether a retrieved device identifier matches, and provide an indication of a current charge state in response to a match. In some embodiments, the controller of the charger may be configured to send an electrical pulse to the rechargeable device and determine a polarity for charging the device.

As shown in FIG. 1, an example charging system 10 may include a contact pad charger 12 and a rechargeable device 14. The device 14 may interface with the charger 12 for charging and may also be enclosed for protection while charging.

In general, the charger 12 may be any type of contact charger. For example, the charger 12 may be either a compressible contact pad charger (for example, elastomeric pad charger) with substantially high resistance contacts or a pogo pin charger (for example, compressible pin charger) with substantially zero resistance contacts.

The device 14 may be a hearing device, such as a BTE, as shown in the illustration. The device 14 may include a device body 18 having one or more sides. One or more sides may include a terminal 20 to provide an electrical path from the exterior (for example, an outer surface) of the device body 18 to a power storage device within the device body. The power storage device may be used to portably power the device 14 and may require recharging from time-to-time.

The device body 18 may include more than one terminal 20. Each terminal 20 may include a conductive material, such as gold, copper, or any other suitable conductive metal or material. Other portions of the device body 18 may be non-conductive, and one or more portions may be formed of a material that is suitable for contact with the skin of a user, inside or outside of the ear.

An extension portion 22 may extend from the device body 18. The extension portion 22 may be free of any terminals (for example, is non-charging). In one or more embodiments, the extension portion 22 may include components that can be powered. For example, the extension portion 22 may include a transducer to produce sound, which may be inserted into an ear or ear canal during use and is electrically powered by an operative coupling to the power storage device of the device body 18. In one or more embodiments, the device 14 may not include an extension portion 22 (for example, for ITC, ITE, or CIC type hearing aids).

The charger 12 may define an open position, in which the charger 12 is capable of receiving the device 14 for charging. A charging cavity 16 may be defined for receiving the device body 18 of the device 14, which may have one or more terminals 20. Any extension portion 22 of the device 14 may be received into a well 26 defined by the charger 12. The charger 12 may include a liner 24 and conductors 28, 29 that at least partially define the charging cavity 16.

The charging cavity 16 may be sized and shaped to receive the device body 18 in more than orientation for charging. For example, the device body 18 may be rested on either side and in various rotational orientations while resting in the charging cavity 16. When resting on a side, the device 14 may appear to lie flat, in a natural position within the charging cavity 16.

The charger 12 may include a base 30 and a lid 32, which may be opened for exposing the charging cavity 16 and may be closed to initiate charging of the device 14. The charger 12 may also include a pin assembly 34 for disconnecting an electrical connection between the conductors 28 of the base 30 and the conductors 29 of the lid 32, for example, when the lid 32 is opened. In some embodiments, the device 14 cannot be charged until the lid 32 is closed.

In some embodiments, the device 14 may be placed on either side without regard to the particular polarities of the charger 12 or the device 14. Either or both of the charger 12 and the device 14 may have a predetermined charging polarity. For example, one terminal or side of the device 14 may be defined as being electrically positive relative to another terminal or side of the device. One or both of the charger 12 and the device 14 can include power management electronics for accommodating either orientation of the device 14 in the charging cavity 16 (for example, a "right side up" or an "upside-down" polarity). In one or more embodiments, the charger 12 may be capable of reversing the polarity of the conductors 28, 29 upon detecting the polarity of the terminals 20 of the device 14.

The electrical resistance, or conductance, between the conductors 28, 29 may be defined to include both inherent and external variations. In some cases, the resistance across each conductor 28, 29 may range from about 100 ohms, about 200 ohms, or about 300 ohms (for example, when clean) to about 1500 ohms, about 1300 ohms, or about 1200 ohms (for example, when dirty). In some embodiments, the resistance between the conductors 28, 29 may range from about 300 ohms to about 1200 ohms while being capable of maintaining a desirable charging rate of the device 14.

Heat may be dissipated across the conductors 28, 29 due to the inherent resistance. The resistance may be sufficient to encourage drying of the device 14. For example, the conductors 28, 29 may produce mild heating, which may be beneficial to remove moisture from the device 14 during the charging process, particularly in humid environments. In some embodiments, the resistance may cause the conductors 28, 29 to increase in temperature by greater than or equal to about 2 degrees centigrade, about 4 degrees centigrade, or about 6 degrees centigrade. In some embodiments, the resistance may cause the compressible conductors 28, 29 to increase in temperature by no more than about 10 degrees centigrade, about 8 degrees centigrade, about 6 degrees centigrade, about 4 degrees centigrade, or about 2 degrees centigrade. In some embodiments, the temperature may increase in a range from about 2 degrees centigrade to about 6 degrees centigrade. In one or more embodiments, the temperature may increase by about 4 degrees centigrade.

In some embodiments, the lid 32 may be attached to the base 30 and may be moveable between open and closed positions. The lid 32 may be moved into a closed position with the device 14 in the particular orientation as placed, and the lid 32 may be secured to the base 30. In the closed position, the first and second conductors 28, 29 may be positioned to contact a different terminal 20.

In some embodiments, the charger 12 is free of a power switch (for example, an on/off switch). In some embodiments, closing the lid 32 turns on the charger 12 or otherwise completes a circuit to activate charging and opening the lid turns off the charger or otherwise breaks the circuit.

In some embodiments, the pin assembly 34 may be adjacent to the hinged attachment between the base 30 and the lid 32. In some embodiments, any other suitable position may be used. Using the separable pin assembly 34, a conductive object in accidental contact with the first and second conductors 28, 29, while the lid 32 is in the open position, may be less likely to cause an electrical short and damage electronics in the charger 12. Although a pin assembly 34 is shown, any suitable type of assembly or device for establishing a selective electrical connection may be utilized.

One or more indicators 90 may provide a user with an indication related to the status of the charger 12, which may, for example, be visual or aural. In some embodiments, the indicator 90 may be a visual indicator positioned on the charger 12 to be visible to the user when the charger 12 is closed. Non-limiting examples of indicators include an LED, an LCD, an OLED, and a speaker. In some embodiments (not shown), the indicator 90 may be remote from the charger 12 (for example, on a smartphone connected by wire or wirelessly to the charger 12). Non-limiting examples of indications include statuses related to a charging progress, a charging error, or a cleaning reminder. The indicator 90 may be activated by any suitable condition, such as the closing of the lid 32, placement of the device 14 into the charging cavity 16, or some other condition related to the charger 12 (for example, low battery voltage or connection to external power supply).

Figure 2:
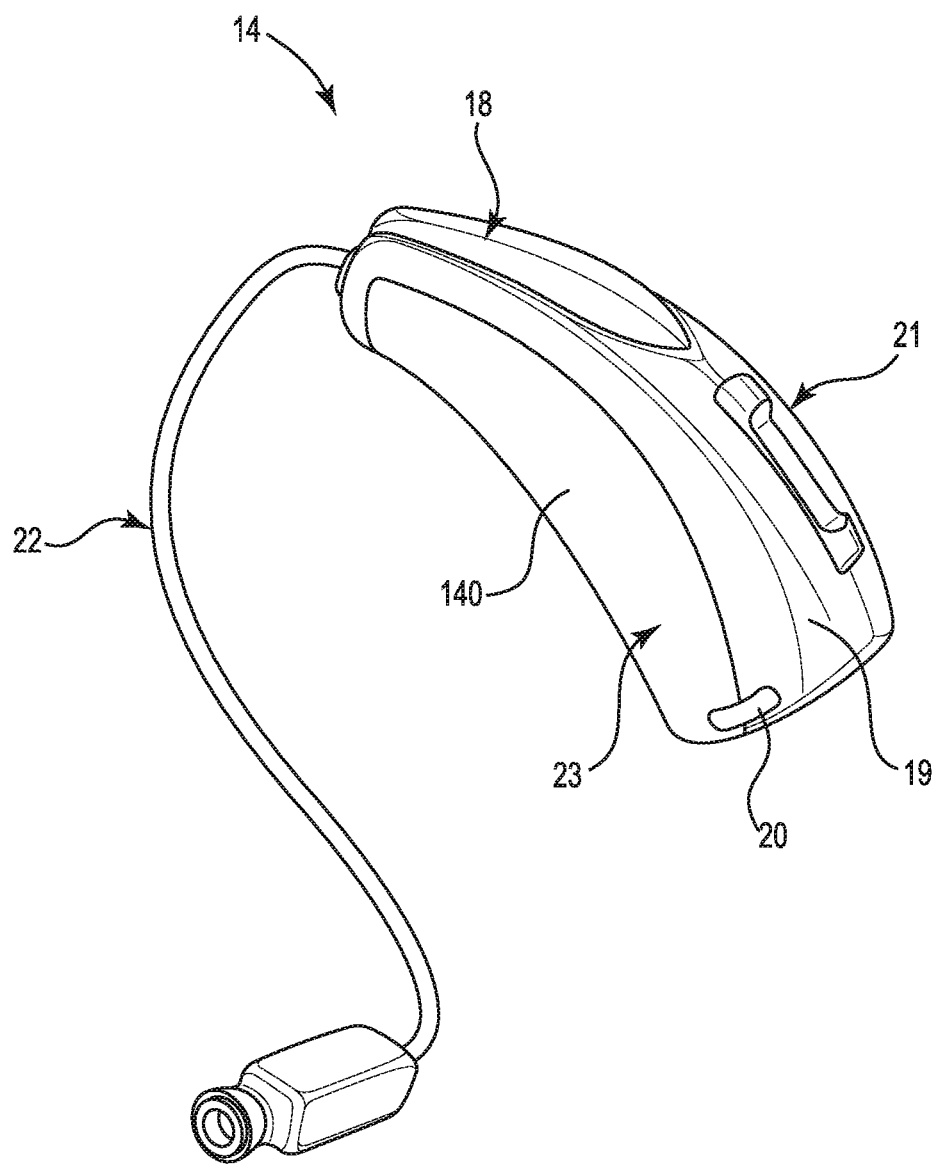
FIG. 2 is an illustration in perspective view of the rechargeable device of FIG. 1.
Figure 3:
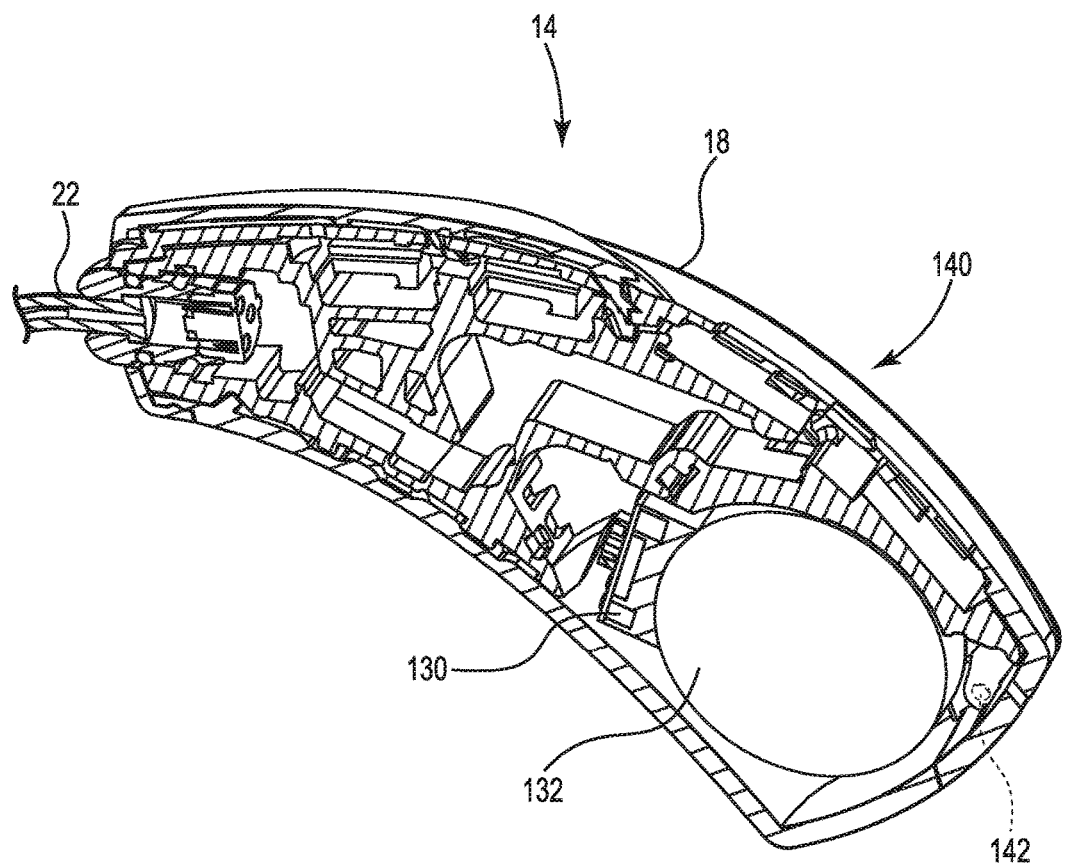
FIG. 3 is a cross-sectional illustration in perspective view of the rechargeable device of FIG. 1.

FIGS. 2 and 3 show more detail of the rechargeable device 14. In particular, FIG. 2 shows the device 14 in a perspective view. FIG. 3 shows a cross-sectional view of the device 14.

A housing 140 may define an exterior of the device body 18. The housing 140 of the device body 18 can take any suitable shape. In some embodiments, the housing 140 of the device body 18 is generally convex in shape. The housing 140 may include one or more terminals 20 and one or more non-conductive portions 19. The terminals 20 of the device body 18 may also be similarly convex or flat in shape to maintain a continuous contour around the device body 18. The extension portion 22 may extend from one end of the device body 18.

The one or more terminals 20 may be positioned in any suitable location on the device body 18 that generally faces the conductors 28L, 28R, 29L, 29R for contact charging. In some embodiments, at least one terminal 20 may be disposed on a first side 21 and another terminal 20 may be disposed on a second side 23. In some embodiments, the terminals 20 may be disposed on opposite sides of device 14.

The terminals 20 may be disposed flush with an outer surface at least partially defined by the non-conductive portions 19. In one or more embodiments, the terminals 20 may recess from or protrude from the surface defined by the non-conductive portions 19.

The device 14 may include a power manager 130 and a power storage device 132 disposed in the body 18 and within the housing 140. The power storage device 132 may be disposed near an end of the device body 18 opposite the extension portion 22 that extends from the device body 18. The power storage device 132 may be rechargeable. For example, the power storage device 132 may be a battery, which may be based on Li, Ag—Zn, Ni-MH, or any other suitable rechargeable chemistry for a battery cell.

The power storage device 132 may be removable. Any suitable technique for providing a removable power storage device 132 may be utilized. In some embodiments, the device body 18 may include a pin 142 for hinging a battery door (not shown) to allow the power storage device 132 to be removed. The pin 142 may extend from one side 21, 23 of the device body 18 to the other side 21, 23.

Alternatively, the power storage device 132 may not be removable. In other words, the power storage device 132 may be permanently disposed within the device body 18 (for example, not easily removable by a user).

In some embodiments, the pin 142 may not be needed. In such embodiments, the terminals 20 may be positioned in a location near where the pin 142 would be located, which may facilitate utilization of the same antenna designs for both removable and non-removable power storage devices 132.

To charge the power storage device 132, such as a Li-ion battery within a rechargeable device 14, a device charging interface may be connected between components of the charger 12 (FIG. 1) and the rechargeable device 14. The interface may be at least partially disposed in the charger 12, the rechargeable device 14, or both.

Figure 4:
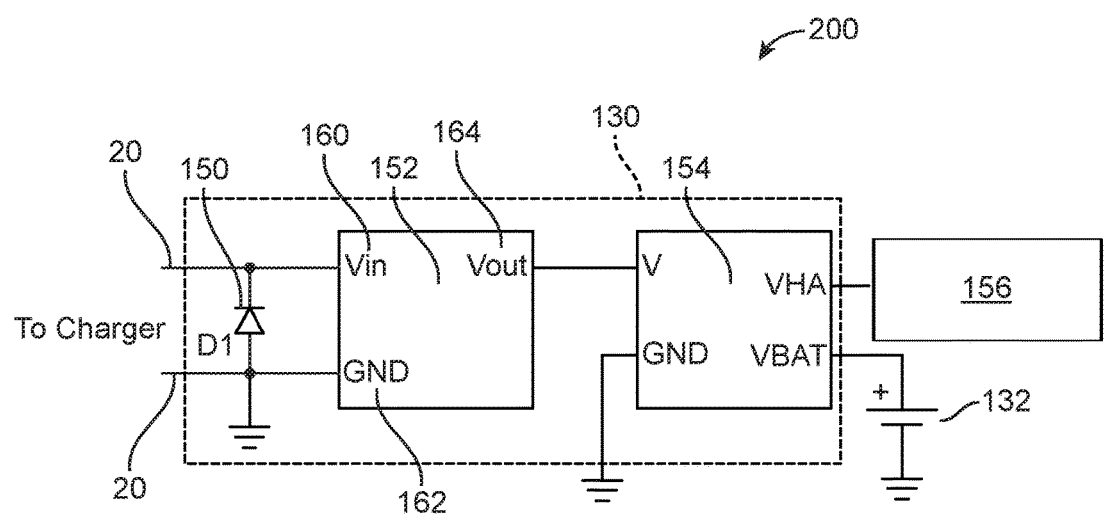
FIG. 4 is a diagram of charging electronics of the rechargeable device of FIG. 1.
Figure 5:
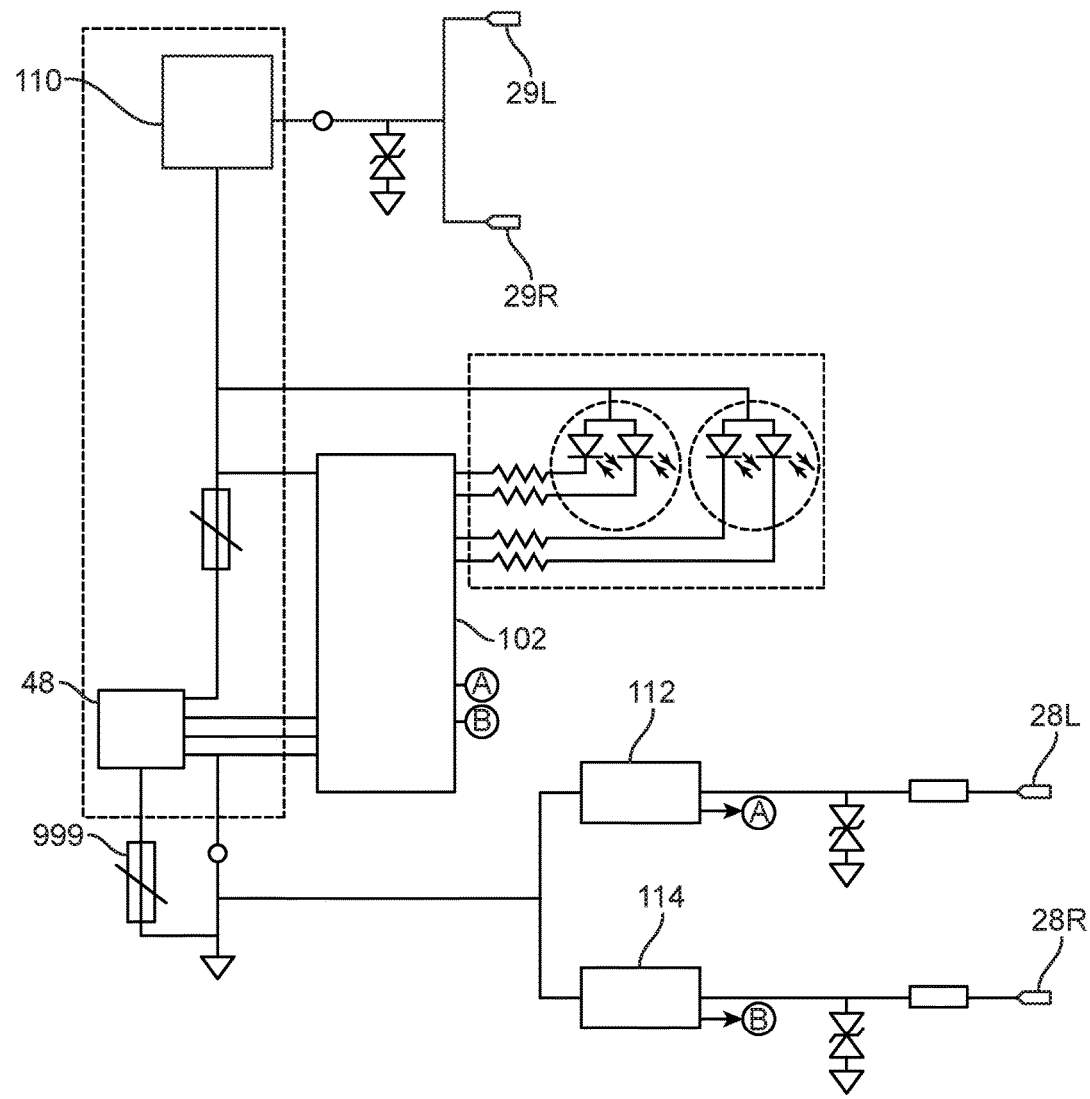
FIG. 5 is a diagram of charging circuitry of the charger of FIG. 1 compatible with the charging electronics of FIG. 4.

FIGS. 4 and 5 show diagrams of the functional circuits that may be used for charging. In particular, FIG. 4 shows a diagram of the charging electronics 200 of the device 14 (FIGS. 1 to 3) that at least partially form the charging interface. FIG. 5 shows an example of circuitry components of the charger 12 (FIG. 1) that at least partially form the charging interface.

The device 14 may be operatively coupled to the charger 12 for charging in at least two different orientations. For example, the device 14 may be coupled in two different orientations each associated with a different polarity for charging. In either orientation, the terminals 20 may be operatively coupled to one pair of charger conductors, such as conductors 28L, 29L or conductors 28R, 29R, when the device 14 is placed into the charger for charging. The charger 12 may be capable of providing a direct current (DC) charging voltage in either polarity (for example, supplying a positive voltage any of the charger conductors).

In some embodiments, the charging electronics 200 of the device 14 may cooperate with the components of the charger 12, such as a controller 102, to provide "Either way OK" (EWOK) charging. The controller 102 may include a processor and a memory. The charger 12 may also include a power supply 48 configured to provide a charging current. The power supply 48 may be a battery. The controller 102 may be operatively coupled to the power supply 48. The charger conductors 28L, 28R, 29L, 29R may be electrically coupled to the power supply 48 of the charger 12 and to the terminals 20 of the device 14.

The charging electronics 200 may include first and second terminals 20 configured to receive charging current from the charger 12. The terminals 20 may be electrically coupled to the power manager 130. The power manager 130 may also be operatively coupled to device electronics 156. Device electronics 156 may include electronics used to receive auditory signals and to produce sound in a hearing assistance device.

The power manager 130 may include a polarity circuit 150, a voltage regulator 152 operatively coupled to the polarity circuit, a power controller 154 (for example, a Power Management IC or PMIC) operatively coupled to the voltage regulator, and a power storage device 132 operatively coupled to the power controller 154. The power controller 154 may also be operatively coupled to the device electronics 156, for example, to power the device electronics from the power storage device 132.

An input voltage to the power manager 130 may be defined across a voltage input pin 160 (Vin) and a ground pin 162 (GND). The voltage regulator 152 may be a low drop-out (LDO) voltage regulator. The voltage regulator 152 may be connected between the terminals 20 and the power controller 154. The voltage regulator 152 may be used to supply a regulated output voltage at a voltage output pin 164 (Vout) to the power controller 154. The regulated output voltage at the voltage output pin 164 may be less than the input voltage at the input voltage pin 160. The power controller 154 may manage the distribution of electrical power to the power storage device 132 and to the device electronics 156.

The polarity circuit 150 may include one or more diodes electrically coupled to the pair of terminals 20. The one or more diodes of the polarity circuit 150 may allow for testing the polarity of the connection between the device 14 and the charger 12. The polarity circuit 150 may include only a single diode. The one or more diodes may be connected between the terminals 20 and between the input voltage pin 160 and the ground pin 162 of the voltage regulator 152. In other words, the diodes may be electrically coupled in parallel to the terminals 20 and the voltage regulator 152.

An electrical pulse may be sent using the controller 102 to any one of the charger conductors coupled to one of the terminals 20, or contact terminals, of the interface to test the polarity of the connection to the hearing device 14.

The diode of the polarity circuit 150 may be described as being reverse biased in response to a "positive" voltage. The controller 102 may be able to detect and/or determine the polarity based on the detected response to the pulse. Any suitable change (or lack thereof) in the electrical characteristics at the pins 160, 162 may be used to determine the polarity of the device 14. The difference in voltages between the voltage input pin 160 and the ground pin 162 may be detected. The change in voltage of the input pin 160 may be detected. The charger 12 may then be reconfigured, if necessary, to provide electrical power at the correct polarity.

In one example of testing for polarity, the controller 102 may send a "positive" pulse through only one of the charger conductors 28L, 29L (for example, when a rechargeable device is disposed in the left cavity). When the device 14 is coupled to the charger 12 in a "normal" orientation, the diode of the polarity circuit 150 may be reverse biased. The polarity may be detectable because the voltage regulator 150 may respond normally to the "positive" pulse. In some embodiments, an absence of the pulse at the other charger conductor 29L, 28L, respectively, may not be detected, which may indicate a "normal" orientation. For example, the controller 102 or the power manager 152 may be used to determine the polarity for charging the device 14 based on whether the pulse was received by the other charger conductor. The charging current may be provided to the device 14 at the same polarity as the pulse.

When the device 14 is coupled to the charger 12 in a "reverse" orientation, the same "positive" pulse may forward bias the diode of the polarity circuit 150. The voltage between the input voltage pin 160 and the ground pin 162 may be reduced to the forward voltage drop of the diode. In some embodiments, the forward voltage drop across the diode may be small enough (for example, less than about 1 VDC, or even less than about 0.7 VDC) to prevent electrical damage to the voltage regulator 150. In some embodiments, the presence of the pulse at the other charger conductor 29L, 28L, respectively, may be detected, which may indicate a "reverse" orientation. The charging current may be provided to the device 14 at a polarity opposite to the electrical pulse.

After using the polarity circuit 150 to test the polarity of the connection, the charger 12 may be capable of reconfiguring the charging current to provide DC voltage at the appropriate polarity detected. In this manner, the charger 12 and device 14 may facilitate EWOK charging.

In one or more embodiments (not shown), the polarity circuit 150 may include a full bridge rectifying circuit disposed in series between the terminals 20 and the voltage regulator 152. The full bridge rectifying circuit may facilitate EWOK when the device 14 placed in the charger in either. In particular, the full bridge rectifying circuit may itself direct input voltage to the correct polarity regardless of the orientation of the device 14 in the charger 12 without the need for a polarity test or the ability of the charger 12 to reverse the polarity of the charging current. In some embodiments, the full bridge rectifying circuit includes multiple diodes (for example, using 4 diodes).

Although a full bridge rectifying circuit in the polarity circuit 150 may obviate the need for a polarity test, a single diode may take less physical space than a full bridge rectifier and may result in a lower voltage drop between the terminals 20 and the voltage regulator 152 to facilitate more efficient charging. In some embodiments, the device 14 the terminals 20 may not be operatively coupled to a full-bridge rectifying circuit for charging.

The device 14 may be supplied a sufficient voltage for charging the power storage device 132. The power storage device 132 may have a minimum voltage threshold for charging. In some embodiments, a desirable voltage range is between about 6 VDC and about 12 VDC, which may be supplied from the charger 12 or received by the power manager 130. In some embodiments, a boost converter 110 may be connected between the controller 102 and the power supply 48 to provide a sufficient voltage to the terminals 20. In some embodiments, a standard USB connection may be used to power the charger or interface circuit. For example, a USB standard 5 VDC may be boosted by the boost converter 110 to increase the voltage to the desirable range.

In some embodiments, based on the input voltage detected, an estimated resistance across the conductors 28, 29 in the charger 12 may be determined, for example, in response to an estimated voltage difference between a known supply voltage and the detected input voltage. In some embodiments, the controller 102 of the charger 12 or the power manager 130 (for example, the power controller 154) of the device 14 may be capable of calculating the estimated resistance.

Figure 6:
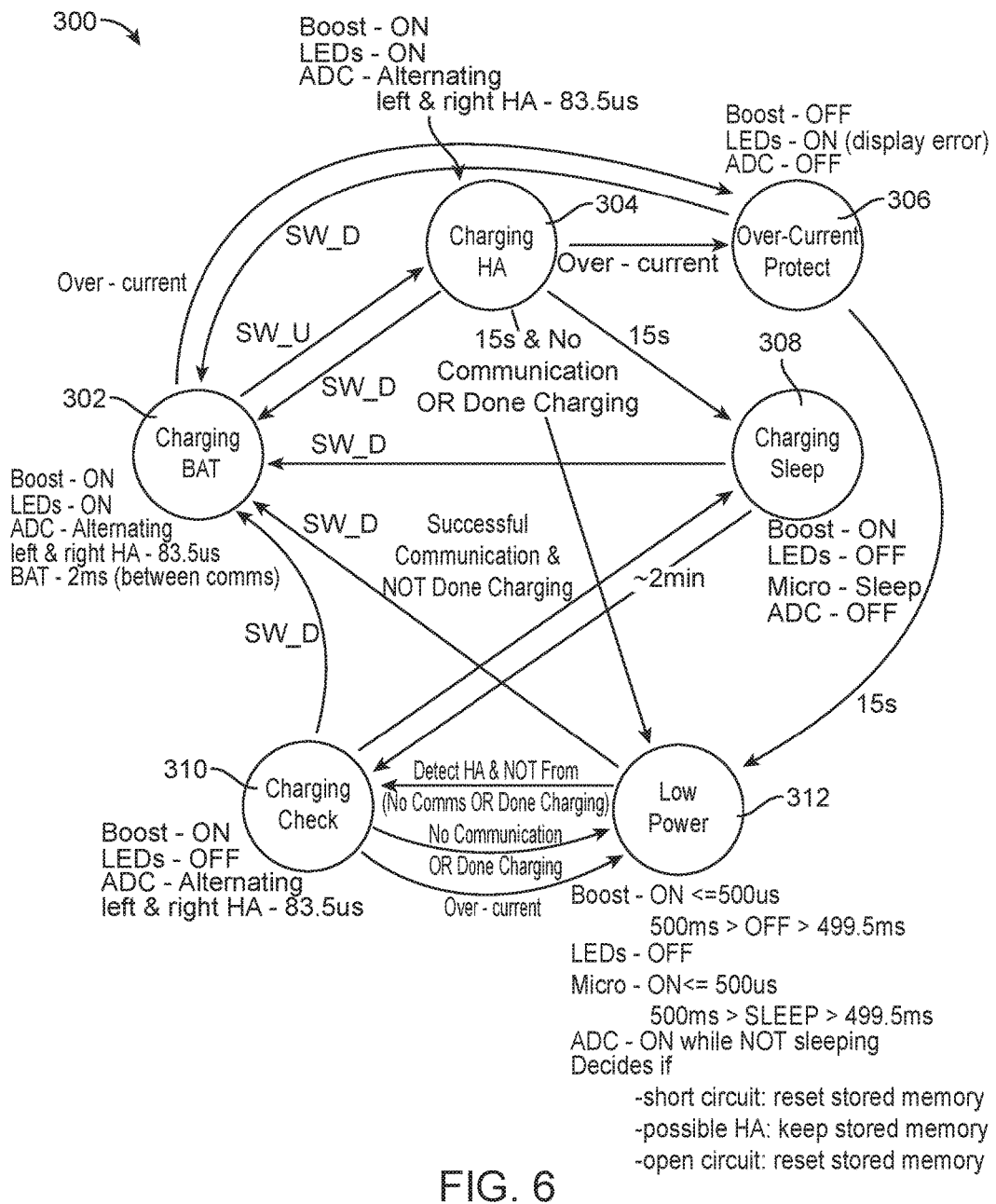
FIG. 6 is a state diagram of a charging algorithm compatible with the charger of FIG. 1.

In some embodiments, when the power controller 154 receives a large enough voltage (for example, greater than about 3 VDC), the power controller 154 may turn on and begin a charging algorithm, such as the algorithm represented by state diagram 300 (FIG. 6). The charging algorithm can receive a varying amount of current, which may correspond to the state of charge but also to a varying resistance in the charging system.

A communication link may be established between the device 14 and the charger 12, which may be capable of communicating the state of charge of the device to the charger. In some embodiments, the power manager 130 may modulate the current corresponding to the input voltage. For example, the power controller 154 may be configured to modulate the current drawn while charging the power storage device 132 or powering the device electronics 156. The modulated current may be used communicate information back and forth between the device 14 and the charger 12. For example, the power manager 130 may communicate an input voltage detected or a device identifier.

The communication protocol implemented in the interface for the charging processes may use a load modulation scheme. Communication can exist on the power supply lines, which may reduce physical complexity in the interface. On the charger side, the controller 102 may use an analog-to-digital converter (ADC) and two internal amplifiers to monitor the load modulated signal. In some embodiments, the controller 102 may use only one ADC, which may facilitate space-savings.

The communication link between the controller 102 of the charger 12 and the power controller 154 of the device 14 may run at any suitable rate. In some embodiments, the communication link may run between about 1 kHz to about 3 kHz. In some embodiments, the communication link may run at about 2 kHz. In one or more embodiments, a bit may exist within a window of about 500 μs but the signal may be valid only during half of the window (for example, for about 250 μs). In some embodiments, the interface may include two communication links, one for each device 14 in the charger 12. In such embodiments, the ADC may have a sampling period that is less than about 125 μs.

In operation, the ADC of the controller 102 may monitor the charging current supplied from the charger 12 to the device 14, and the controller 102 may store a weighted average value of the current in a channel (for example, each corresponding to one device). In some embodiments, when a single value is much greater than the average, the result may be thrown out as to not alter the weighted average. In such cases, a "1" bit may be shifted into a communication register. If the result is found to be not significantly higher than the average after a bit period, a "0" bit may be shifted into the communication register. After a communication byte period (for example, a 1-byte period may be equal to about 11 bits=1 start bit+8 data bits+1 parity bit+1 stop bit), the communication register may be stored, and the communication channel may be reset. In this manner, the controller 102 may be used to detect digital communication in the charging current.

While monitoring for communication, the controller 102 may recognize when there is no communication on the line. In this case, the controller 102 may check the voltage of the on-board battery of the power supply 48. In this manner, the charger 12 may be capable of continuously monitoring two communication channels with the devices 14 and the on-board battery of the power supply 48.

The controller 102 may be able to recognize if the weighted average for either channel ever reaches too large of a current. In such cases, the charger 12 can be configured to shut-down the boost converter, send the controller 102 into a low powered sleep mode, and inform the user that there might be a short circuit in the charger. A short circuit may be a problem if a conductive object (for example, metal object such as keys, coins, jewelry, etc.) or an incorrect rechargeable hearing device is accidentally placed in the charger 12.

In some embodiments, the power controller 154 of the device 14 may be capable of detecting a portion of the charging current and providing a managed power output to the power storage device 132 in response to detecting the portion of the charging current. The portion of the charging current may be modulated by the power controller 154 to communicate over the pair of terminals 20. On the charger side, a sense block 112, 114 may be operatively coupled to each pair of charger conductors, such as conductors 28L, 29L or conductors 28R, 29R, may be used to detect the changes in current.

In some embodiments, the power controller 154 may be configured to monitor cleanliness of the device 14. For example, the voltage drop may be determined by the power controller 154 in response to monitoring the voltage at the voltage output pin 164 compared to the ground pin 162. The monitored voltage may be communicated back to the charger 12 using a load modulation scheme (for example, over a powerline communication link). After receiving the communication signal from the device 14, the charger 12 may have access to the voltage drop across the terminals 20. Using the voltage drop information, the controller 102 can be configured to determine exactly how dirty the hearing devices or charger conductors (or contacts) are and may provide an indication to the user that their hearing devices need cleaning.

In some embodiments, the charger 12 can notify the user of a level of cleanliness, or dirtiness, in response to an inferred contact resistance from the monitored voltage information. The level of cleanliness, or dirtiness, may be presented or stored with varying granularity. In some embodiments, the level is presented or stored on a binary scale (for example, clean or dirty, 1 or 0). On the other end of the spectrum, in some embodiments, the level is presented or stored a continuous scale (for example, clean or 0% dirty, 1% dirty, . . . 99% dirty, and 100% dirty).

In some embodiments, the controller 102 may be configured to provide a cleaning reminder when an estimated resistance across one or more conductors 28L, 28R, 29L, 29R is higher than a high resistance threshold (or an input voltage/current is below a low voltage/current threshold). The cleaning reminder may indicate that the charging cavity 16 (FIG. 1) is dirty, which may prompt a user to clean the cavity 16 (for example, via the indicator 90 as shown in FIG. 1). In particular, the user may be prompted to clean the conductors 28L, 28R, 29L, 29R of the charger 12 or the terminals 20 of the rechargeable device 14. Cleaning can facilitate the restoration of desirable charging times.

The charger 12 may be configured to generate heat in response to the charging current to remove moisture from the device 14. The charger 12 may be free of a desiccant. In some chargers having conductive pins with about zero resistance, a heating element 999 can be added. The heating element 999 can be self-regulating, which may mitigate overheating. For example, the heating element 999 can have a positive temperature coefficient (PTC) of resistance. With a PTC of resistance, as the temperature increases the resistance increases and at a defined temperature the heater will no longer create more heat than is needed to remain at a given temperature.

In some cases, the heating element 999 can be automatically turned on in response to the charger 12 being plugged in to an external power supply and detecting a rechargeable device 14 coupled to the pair of charger contacts in the cavity 16. In some embodiments, the charger 12 may include conductors 28L, 28R, 29L, 29R with at least a moderate resistance, and the conductors themselves may act as heaters to heat the device 14 to dry while charging.

In some embodiments, the heater 999 may include a high-power light-emitting diode (LED). The LEDs may provide heat when powered on and may also provide visual aesthetics. The LEDs may not be inherently self-regulating. In one or more embodiments, the heater may include temperature sensors to provide self-regulation. In one or more embodiments, a temperature signal can be communicated from the power controller 154 to the charger 12.

Each device 14 may be associated with a unique device identifier. The device identifier may be, for example, stored in a memory of the power controller 154. The controller 102 of the charger 12 may be configured to store one or more device identifiers in memory. In some embodiments, a plurality of device identifiers may be stored in memory. When a device 14 is disconnected from the charger 12 (for example, charging stops), the device identifier may be associated with a last charge state of the power storage device 132 of the device 14. In some embodiments, the controller 102 may be configured to store a timestamp associated with the last charge state in memory.

In some embodiments, a device identifier may be retrieved from the device 14 each time the device is received in the charging cavity of the charger 12. The controller 102 may determine whether the retrieved device identifier matches the device identifier in memory. If the device identifiers match, the charger 12 may provide an indication (for example, using a visual indicator) of a current charge state of the hearing device. The indication may be an estimate of the charge state of the power storage device 132 based on the last charge state.

The last charge state may become less accurate as time goes on, particularly if the device 14 has been used in a manner that quickly discharges the power storage device 132. The controller 102 may also include a clock to provide a current time. The clock may also be used to provide the timestamp associated with the last charge state and the device identifier in memory. The controller 102 may use the current time and timestamp to determine whether the difference exceeds a time threshold. For example, the time threshold may be no more than about 2 hours, no more than about 1.5 hours, no more than about 1 hour, no more than about 0.75 hours, or even no more than about 0.5 hours. If the time threshold is not exceeded by the difference, the indication of the current charge state based on the last charge state may be provided.

If the time threshold is exceeded, the charger 12 may not display the indication based on the last charge state. In some embodiments, the charger 12 may not display an indication until the charge state of the power storage device 132 can be measured. In some embodiments, if the time threshold is exceeded, the controller 102 may request charging data from the device 14. The charging data may include at least one of: a voltage associated with the power storage device 132 and an estimated current charge state of the device 14. The charger 12 may provide an indication of the current charge state of the hearing device in response to the charging data.

One or more of the controllers described herein may include a processor, such as a central processing unit (CPU), computer, logic array, or other device capable of directing data coming into or out of charger 12 or rechargeable device 14. In some embodiments, the controller includes one or more computing devices having memory, processing, and communication hardware. The functions of the controller may be performed by hardware and/or as computer instructions on a non-transient computer readable storage medium.

The processor of the controller may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

FIG. 6 shows a state diagram 300 representing one example of a charging algorithm including low powered mode logic. In the low powered state 312, the charger is essentially turned off. The charger can enter a low powered state 312 in various ways, such as a short circuit condition, a no hearing device condition, or a done charging condition.

In general, if the charger detects a state that it was not in before (for example, a change in state), and that state is safe, the charger may fully wake up and wait for communication for a period of time (for example, about 1 to about 15 s). If the charger finds communication, then the charger may stay on and charge the hearing device(s), along with turning on a visual indicator (for example, LED) and notifying the user that the charging algorithm has begun.

If the charger does not find any changes in state, the charger can turn everything off and can wait for another interval (for example, about 512 ms). This low powered mode may reduce the overall power used in a low power state 312 (no-charge sleep) by a factor of up to about 500. In the low powered state 312, the on-board battery can last for multiple years. The low powered state 312 can facilitate installation of the battery at the time of manufacturing without needing a power switch. The charger can be tested and sent to the customer without taking the battery out, and the hearing device can be sealed during manufacturing.

In some embodiments, the charger includes a user switch for entering a low powered mode. The switch may be used to toggle between various states in the state diagram 300. The pressing of the switch is represented in the state diagram by SW D. The releasing of the switch is represented in the state diagram by SW U. In some embodiments, the functionality of the switch can be replaced or augmented by automatic processes (for example, detection of certain conditions). In some embodiments, the charger is free of the switch. Instead of detecting the state of a manual switch, the charger may detect the presence of the rechargeable device in the charger, an open or closed circuit between the charging contacts, or the position of the lid (open or closed).

In battery charging state 302, the controller may charge a battery of the power supply in the charger. There may be no device in the charger. An open circuit may be detected by the controller. If the user switch is pressed, the controller may move into device charging state 304, in which the device begins to charge. In any state, when the switch is released, the controller may return to the battery charging state 302.

Upon detecting an open circuit condition, the charger may inform the user that nothing is charging and may prompt the user to check if the hearing assistance device was placed in the charger correctly.

In battery charging state 302 or device charging state 304, if too much current is being drawn, the controller may move into an over-current protect state 306. In state 306, the boost converter and ADC may both be turned off. A visual indicator may display an error visible to the user. Too much current may indicate a short circuit, which may be caused by an unintended object present in the charger.

If a switch is released, the controller may return to the battery charging state 302. Otherwise, after a duration (for example, after about 15 seconds), the controller may enter a low power state 312, or low power mode.

In the low power state 312, the controller may decide to reset stored memory in response to detecting a short circuit (for example, state 306), keep stored memory due to detecting a rechargeable device in the charger (for example, state 304), or to reset stored memory in response to detecting an open circuit (for example, state 302).

In device charging state 304, after a duration (for example, after about 15 seconds), the charger may enter a charging sleep state 308. In state 308, the controller and the ADC may be put into a sleep mode. The visual indicator may be turned off. The boost converter may remain on to continue charging the device.

Once charging is finished in state 304, or no communication from the device is detected after a duration (for example, after about 15 seconds), the controller may enter the low power state 312.

From state 312, the controller may enter a charging check state 310. In state 310, the boost converter and the ADC may be turned on. The visual indicator may be turned off. Further, in state 310, if there is no communication with the device or charging is finished, the controller may return to low power state 312. Alternatively, if an over-current is detected, the controller may also return to low power state 312.

From the charging sleep state 308, the controller may enter the charging check state 310 (for example, after about 2 minutes). If there is successful communication with the device and the device is not finished charging, the controller may return to charging sleep state 308.

In some embodiments, the controller 102 may have a timer running at an interval. For example, about every 512 ms the charger can "wake-up" to turn on the boost converter and monitor the current. Within a short time (for example, about 1 ms), the charger may be able to tell if the lid has been opened, if there is a short circuit, if there is an open circuit, or if there may be 1 or 2 hearing assistance devices within the charger.

In some embodiments, the charging algorithm may disconnect the charger when done charging to save the on-board battery, especially with a travel charger. In some embodiments, when the charging algorithm is started or restarted, the charger can be configured to read a device identifier, such as a manufacturer identification (ID) value (for example, a serial number) of the device through the communication link.

The charger may report that the device is done charging even if the charging algorithm says otherwise. The charging algorithm may not be able to provide an accurate measurement of the charging status for a few minutes. The charger may store a last charge state with an optional timestamp upon disconnecting, and when restarted, the charging algorithm can check the timestamp to see if a relatively short period of time has passed, and may indicate that hearing device is still charged before an accurate measurement is provided by the charging algorithm.

The battery voltage of the hearing device may be measured through the same communication link to check that the hearing device is still nearly completely charged after not being charged for a threshold period of time (for example, a duration after the timestamp of the last charge state), which may prevent falsely reporting a charged battery. This may be helpful when a user takes the hearing device out of the case and discharges the battery significantly in a relatively short period, then places the device back in the charger. By reading the manufacturer ID value and battery voltage, the charger can detect that the hearing device should be charged, but is not, and can report the correct state of charge (for example, within seconds instead of within minutes).

In some embodiments, the visual indicators may be automatically turned on or off. For example, when the state of the charger changes due to human interaction, the visual indicator (for example, LED) can turn on and flash to notify the user of a state change. After a period without user interaction, the LEDs can slowly dim to a completely off state. The LEDs can represent a large portion of the power required to run the charger, so automatically turning off the LEDs can save a substantial fraction of the on-board battery life. The LEDs can remain off until a user interaction brings the LEDs back on. In some embodiments, a state change not initiated by a user will keep the LEDs off.

Figure 7:
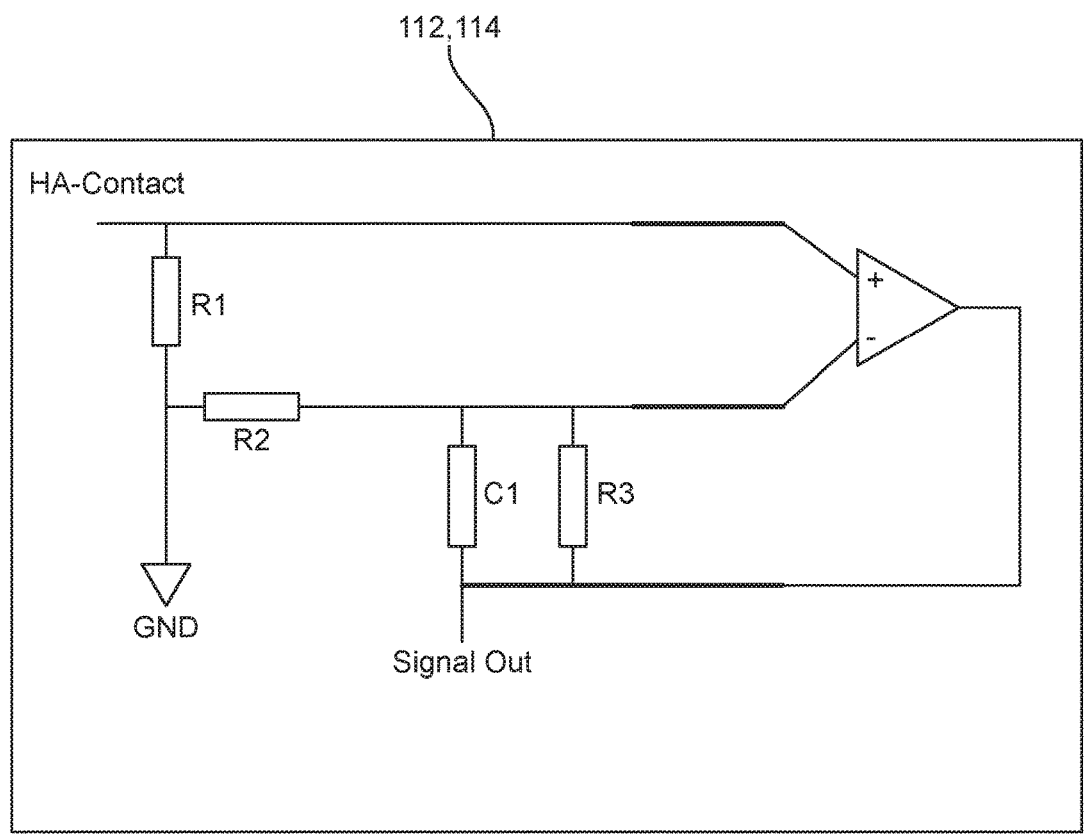
FIG. 7 is a diagram of circuitry of a sense block used in the charging circuitry of the charger shown in FIG. 5.

FIG. 7 shows an example circuit diagram for one of the sense blocks 112, 114 (for example, left sense and right sense blocks; see FIG. 5). The example circuit may be used for demodulating communications and detecting over-current states. For example, the circuit can include a differential amplifier or comparator (for example, op-amp), resistors R1, R2, R3, and/or a capacitor C1. The sense block can demodulate powerline communications over high impedance presented by charger contacts (for example, compressible contact pads).

Figure 8:
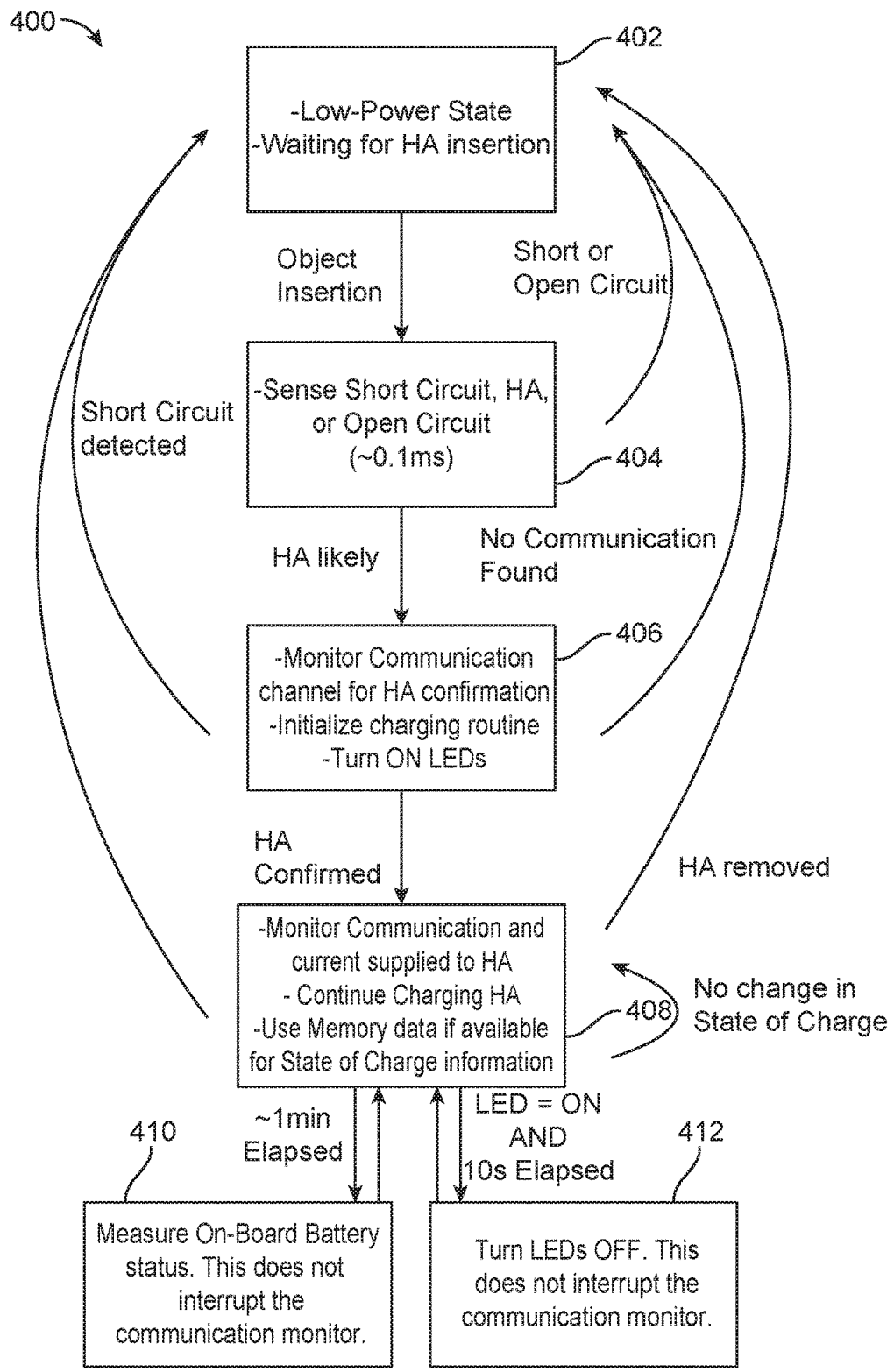
FIG. 8 is a flowchart of a charging algorithm compatible with the charger of FIG. 1.

FIG. 8 shows a flowchart of one example of a charging method 400. In process 402, the method 400 may wait in a low power state for a rechargeable device insertion into the charger. Upon an object being inserted into the charger, in process 404, the charger may sense whether the object has caused a short circuit, is likely to be a rechargeable device, or has caused an open circuit. If the object has caused an open or short circuit, the method 400 may return to waiting in process 402. If the object is likely to be a rechargeable device, then the method may continue on to process 406.

In process 406, a communication channel may be monitored to confirm the presence of the rechargeable device. The charging routine may be initialized, and the visual indicators of the charger may be turned on. If no communication with the rechargeable device is detected, the method 400 may return to waiting process 402. If a short circuit is detected, the method 400 may also return to waiting process 402. If the presence of the rechargeable device is confirmed, the method 400 may continue on to process 408.

In process 408, the communication channel with the rechargeable device may be monitored and a charging current may be supplied to the device. The charger may also use memory to store a charge state of the device. While being monitored, if there is no change in the charge state of the device, the charger may continue to charge the device. If the device is removed, the method 400 may return to waiting process 402.

Periodically (for example, every 1 minute), the method 400 may move on to process 410, the on-board battery of the charger may be measured. This measurement may not interrupt monitoring of the communication channel. After the on-board battery measurement, the method 400 may return to process 408.

If the visual indicator is on and a duration has elapsed (for example, about 10 seconds), the visual indicator may be turned off. This may not interrupt monitoring of the communication channel. After turning off the visual indicator, the method 400 may return to process 408.

Figure 9:
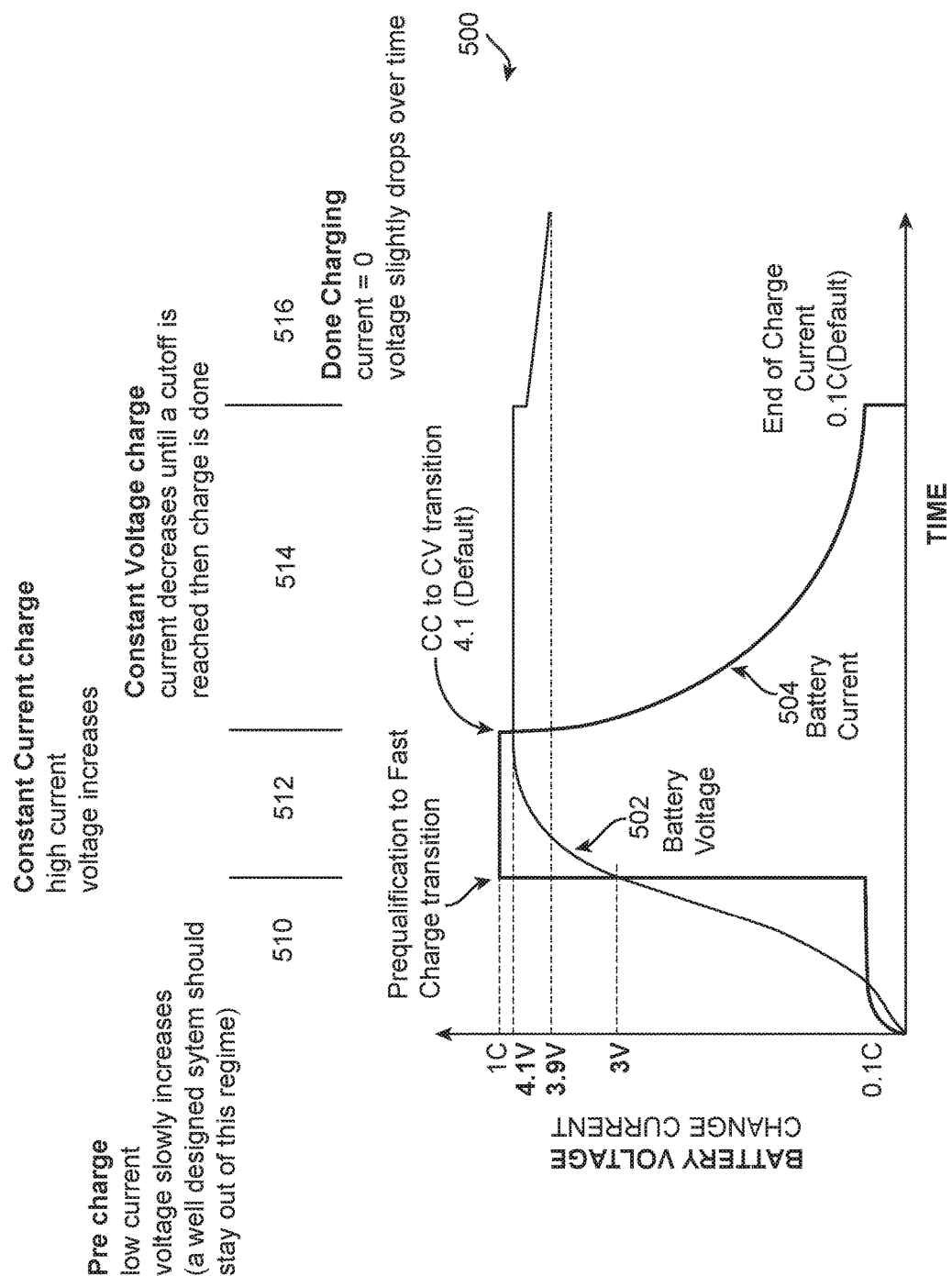
FIG. 9 is a graph showing charging voltage and current for a lithium-ion battery.

FIG. 9 shows a graph 500 of voltage 502 and charge current 504 over time of a battery that may be used as a power storage device in a rechargeable device. For example, the graph 500 may be representative of a typical Li-ion battery. Due to the charging profile of Li-ion batteries, the ability to determine the charge status may take several minutes.

The charging profile may be described in four different phases: a pre-charge phase 510, a constant current charge phase 512, a constant voltage charge phase 514, and a charging complete phase 516.

In the pre-charge phase 510, the charging current 504 may be low and voltage 502 may slowly increase. Preferably, a recharging system will prevent a battery from entering into this phase. The pre-charge phase 510 may also be described as prequalification.

After the pre-charge phase 510, the charging may enter into fast charging once a particular voltage is reached (for example, 3 V). Charging may continue with the constant current charge phase 512, in which high current is used and voltage continues to increase.

The constant voltage charge phase 514 follows once a particular voltage is reached (for example, 4.1 V). The charging current 504 may decrease until a cutoff is reached (for example, 0.1 C), then the charging is completed.

In the charging complete phase 516, the charging current 504 may be minimal or about zero. The battery voltage 502 may be allowed to drop slightly to a stable level (for example, 3.9 V).

Thus, various embodiments of CHARGING SYSTEMS FOR CONTACT CHARGERS AND RELATED METHODS are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a mobile user device may be operatively coupled to a cellular network transmit data to or receive data therefrom).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like.

The term "and/or" means one or all of the listed elements or a combination of any two or more of the listed elements.

The phrases "at least one of" "comprises at least one of" and "one or more of" followed by a list refers to any one of the items in the list and any combination of two or more items in the list.

What is claimed is:

1. A system comprising:
a rechargeable hearing device comprising a power manager and a power storage device, wherein the power manager comprises:
a pair of terminals configured to receive a charging current from a charger;
one or more diodes electrically coupled to the pair of terminals;
a voltage regulator operatively coupled to the one or more diodes; and
a controller operatively coupled to the voltage regulator and comprising a processor, the processor configured to:
detect a portion of the charging current from the charger;
provide a managed power output to the power storage device in response to the portion of the charging current; and
modulate the portion of the charging current to communicate over the pair of terminals.

2. The system of claim 1, further comprising:
a charger comprising:
a power supply configured to provide the charging current;
a controller operatively coupled to the power supply; and
a pair of contacts configured to be electrically coupled to the power supply and to the terminals of the rechargeable hearing device.

3. The system of claim 2, wherein the power supply comprises a battery and the controller of the charger is configured to enter a low power state.

4. The system of claim 3, wherein the battery is non-removable, and the charger is free of a user switch for entering the low powered state.

5. The system of claim 1, wherein the one or more diodes comprises only one diode.

6. The system of claim 1, wherein the power management circuit is further configured to monitor cleanliness of the rechargeable hearing device.

7. The system of claim 2, wherein the pair of contacts is configured to generate heat in response to the charging current to remove moisture from the rechargeable hearing device.

8. The system of claim 2, wherein the charger further comprises a heating element configured to automatically turn on in response to connecting the charger to an external power source and detecting the rechargeable hearing device coupled to the pair of charger contacts.

9. A charger for a rechargeable hearing device, the charger comprising:
a charging cavity configured to receive a hearing device;
a pair of contacts exposed to the charging cavity, wherein the contacts are electrically couplable to the hearing device to provide a charging current when the hearing device is received in the charging cavity; and
a controller comprising a processor and a memory, the processor configured to:
store a hearing device identifier in the memory of the charger associated with a last charge state;
retrieve a hearing device identifier from the hearing device when received in the charging cavity;
determine whether the retrieved hearing device identifier matches the stored hearing device identifier in the memory of the charger; and
provide an indication of a current charge state of the hearing device in response to the retrieved hearing device identifier matching the stored hearing device identifier in the memory of the charger.

10. The charger of claim 9, wherein the processor is further configured to store a timestamp associated with the last charge state in the memory.

11. The charger of claim 10, wherein the controller further comprises a clock to provide a current time.

12. The charger of claim 11, wherein the processor is further configured to:
determine whether a difference between the current time and the timestamp exceeds a time threshold; and
provide the indication of the current charge state of the hearing device in response to the difference not exceeding the time threshold.

13. The charger of claim 12, wherein the time threshold is up to about one hour.

14. The charger of claim 12, wherein the processor is further configured to:
request charging data from the hearing device in response to the difference exceeding the time threshold; and
provide the indication of the current charge state of the hearing device in response to the charging data.

15. The charger of claim 14, wherein the charging data comprises at least one of: a voltage associated with the power storage device and an estimated current charge state of the hearing device.

16. The charger of claim 9, wherein the controller is further configured to provide the indication of the current charge state of the hearing device in response to a difference between a last charge timestamp and a current time not exceeding a time threshold.

17. A charger for a rechargeable hearing device, the charger comprising:
a charging cavity configured to receive a hearing device;
a pair of contacts exposed to the charging cavity, wherein the contacts are electrically couplable to the hearing device to provide a charging current when the hearing device is received in the charging cavity; and
a controller comprising a processor, the processor configured to:
detect a hearing device in the charging cavity;
send an electrical pulse through one of the contacts; and
determine a polarity for charging the hearing device in response to whether the pulse was received by the other contact.

18. The charger of claim 17, wherein the processor is further configured to:
detect an absence of the pulse at the other contact; and
provide the charging current at a same polarity as a polarity of the electrical pulse.

19. The charger of claim 17, wherein the processor is further configured to:
detect the pulse at the other contact; and
provide the charging current at a polarity opposite to a polarity of the electrical pulse.

20. The charger of claim 17, further comprising the rechargeable hearing device, wherein the rechargeable hearing device comprises a pair of terminals configured without full-bridge rectification to receive the charging current.

* * * * *